March 7, 1933.  H. H. LEDERER  1,900,569
APPARATUS FOR HANDLING MERCHANDISE
Filed Nov. 21, 1930   4 Sheets-Sheet 1
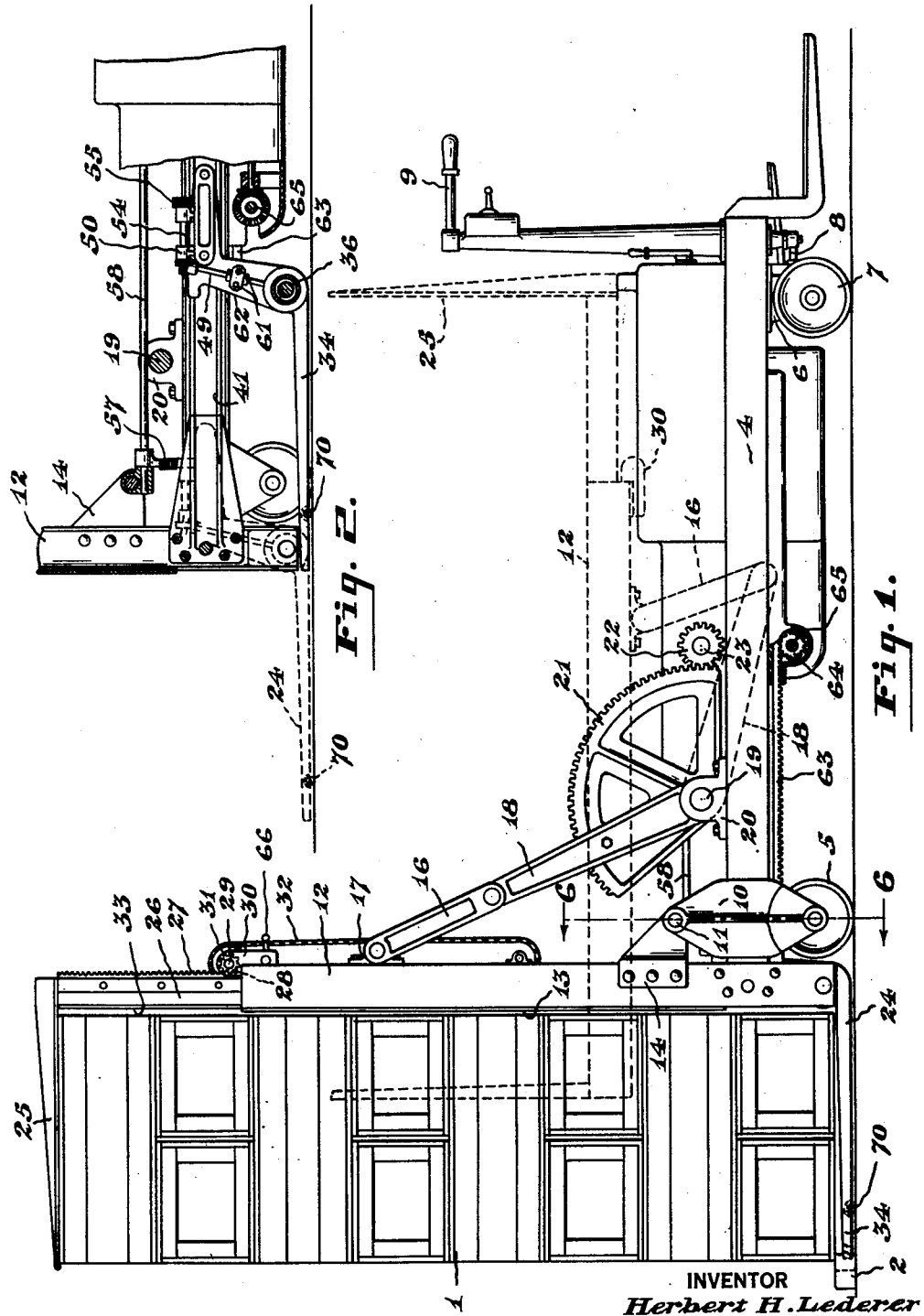
INVENTOR
*Herbert H. Lederer*
BY
*Evans + McCoy*
ATTORNEYS March 7, 1933. H. H. LEDERER 1,900,569
APPARATUS FOR HANDLING MERCHANDISE
Filed Nov. 21, 1930 4 Sheets-Sheet 2
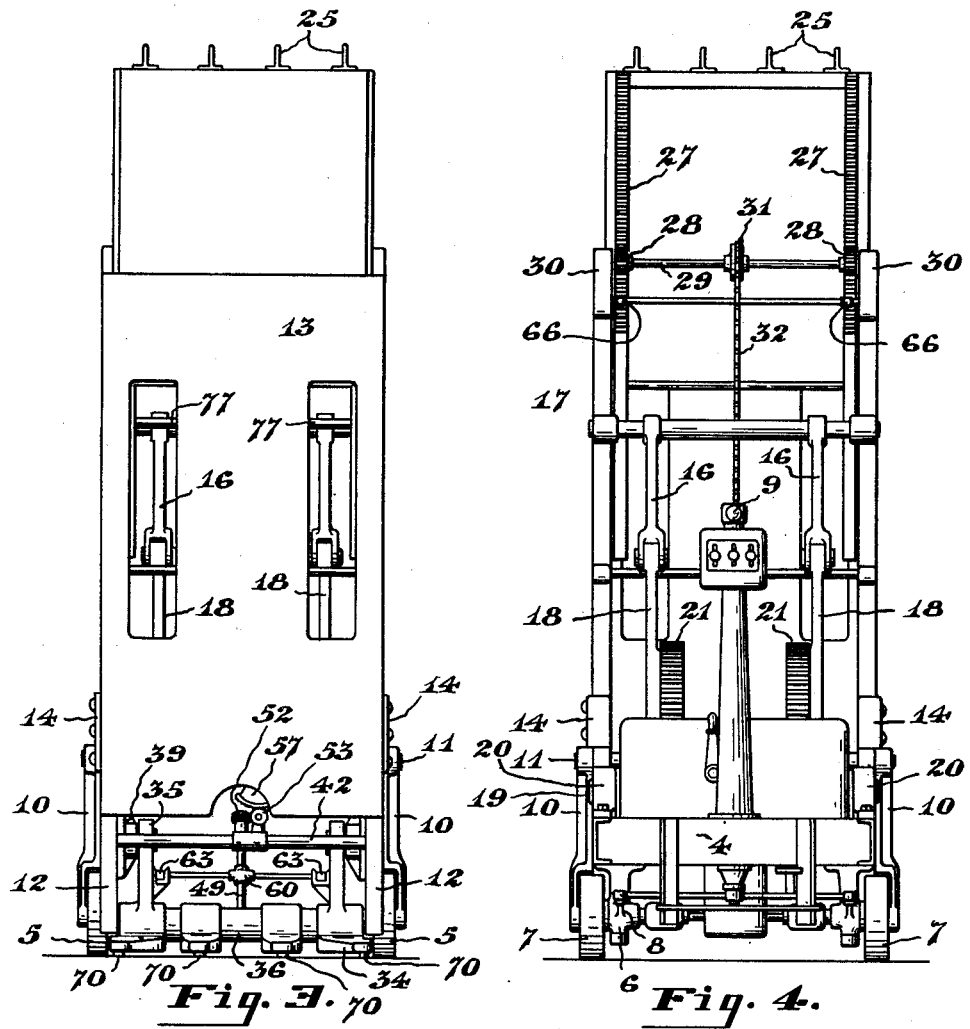
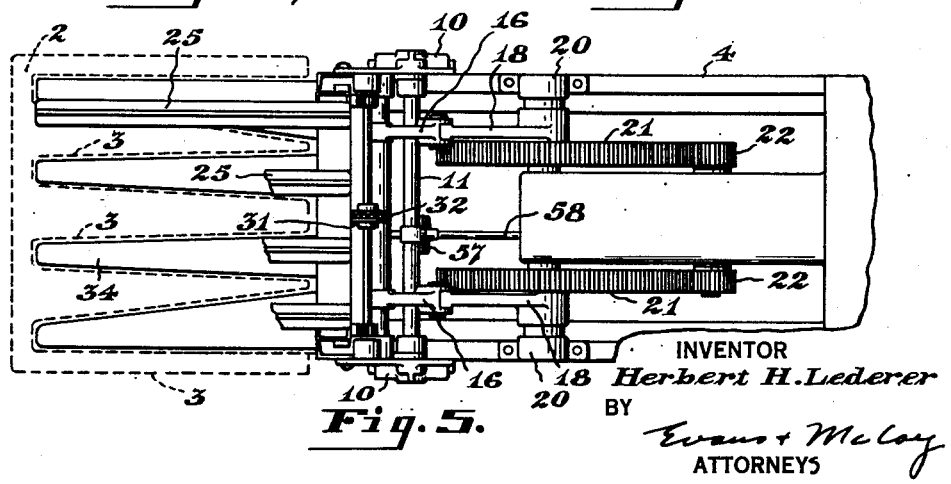
INVENTOR
Herbert H. Lederer
BY
Evans + McCoy
ATTORNEYS March 7, 1933. H. H. LEDERER 1,900,569
APPARATUS FOR HANDLING MERCHANDISE
Filed Nov. 21, 1930 4 Sheets-Sheet 4

INVENTOR
Herbert H. Lederer
BY
Evans & McCoy
ATTORNEYS

Patented Mar. 7, 1933

1,900,569

UNITED STATES PATENT OFFICE

HERBERT H. LEDERER, OF CLEVELAND, OHIO

APPARATUS FOR HANDLING MERCHANDISE

Application filed November 21, 1930. Serial No. 497,141.

This invention relates to the method of and apparatus for handling merchandise and particularly to the handling of merchandise in storage warehouses unloading and loading freight cars and the like.

Packaged and unpackaged merchandise is usually stored in relatively high stacks in warehouses, and it has been the custom in the past to remove each article separately from the stack and place the same on a truck when it is desired to transfer the merchandise to another location or load the same on a truck for delivery, and to separately unload each article. This procedure of individual handling requires considerable labor and consumes considerable time.

One of the objects of the present invention is to provide a new method of moving or transferring stacked merchandise which materially reduces manual labor and time in transferring such merchandise from one location to another.

Another object is to provide a method wherein a complete stack of articles may be bodily moved or transferred without changing the relation of or necessitating the handling of the individual articles, when they are deposited in a new location.

Another object is to provide a method of transferring stacked merchandise wherein a stack of merchandise may be bodily lifted and tilted transversely of the stack to permit the stack to be easily transferred through openings of lesser height than the stack.

Another object is to provide apparatus whereby stacks of merchandise may be bodily lifted and transferred without changing the relative positions of or handling the individual articles.

Another object is to provide apparatus for transferring stacked merchandise, embodying means for lifting a stack of merchandise and tilting the stack to a different position whereby the stack may be easily moved through an opening of lesser height than the stack.

A further object is to provide new and improved apparatus for transferring stacked merchandise, whereby a stack of merchandise may be bodily lifted, transferred to a different location, and replaced in stacked relation without changing the relative positions of or handling the individual articles.

With the above and other objects in view which will be apparent from the following detailed description, the present invention consists in certain features of construction and combinations of parts which will be readily understood by those skilled in the art to which the invention appertains.

In the drawings which illustrate suitable embodiments of the invention,

Figure 1 is a side elevation of the transfer apparatus showing a stack of boxes loaded thereon, the transfer or moving position of the apparatus being shown in dotted outline;

Fig. 2 is a fragmentary side elevation of the lower end gate portion of the apparatus, the end gate being withdrawn, as in depositing the load;

Fig. 3 is a front elevation of the apparatus shown in Fig. 1;

Fig. 4 is a rear elevation of the apparatus;

Fig. 5 is a plan view of the apparatus, the upper end gate portion being broken away and the permanent support for the stacked articles being shown in dotted outline;

Fig. 8 is a front elevation of the transfer apparatus embodying optional means for use in handling stacked barrels and the like;

Figure 6:
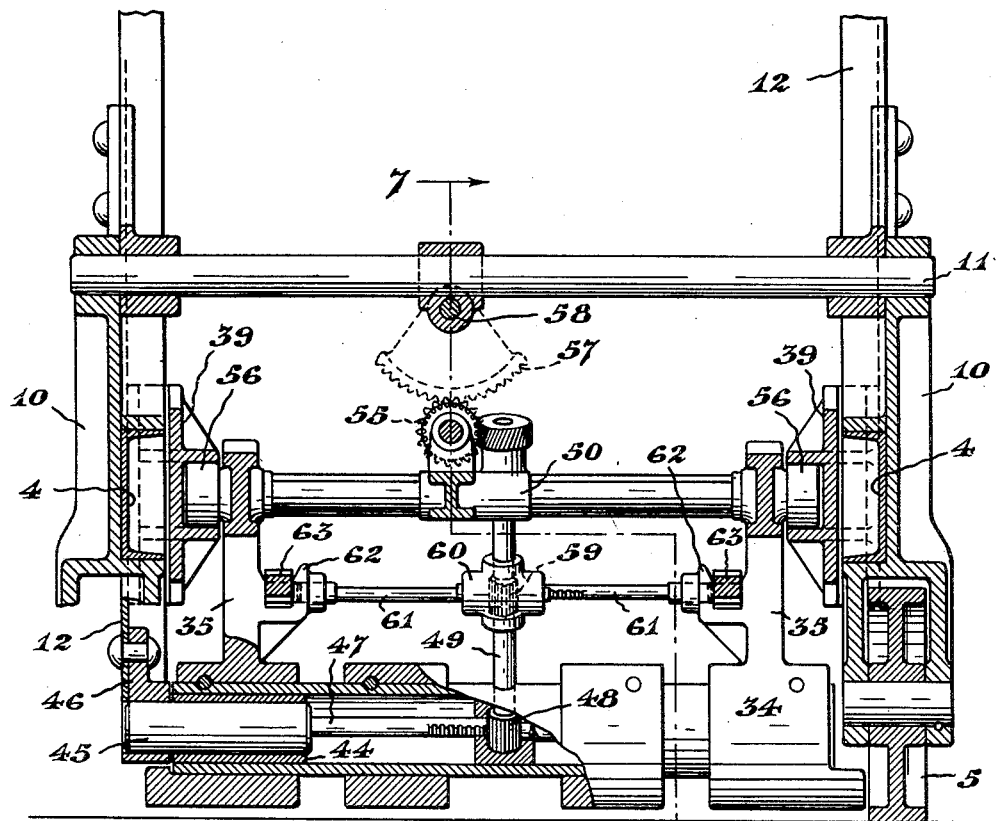
Fig. 6 is an enlarged section taken substantially on the line 6—6 of Fig. 1.

The present invention contemplates a method of transferring or handling stacked merchandise, and the apparatus for carrying out such method, wherein a stack of goods may be bodily transferred without disturbing the stacked relation of or handling the individual articles, so that a material saving in manual labor and time can be effected.

In warehouses, goods such as bags, boxes, crates and the like, are oftentimes stacked to considerable height, and previously it has been impossible to bodily transfer an entire stack to a different location, for the reason that the stack was of greater height than the door openings and the like through which it would have to be moved. Consequently it has been necessary heretofore to manually handle each individual article and re-stack the same in the new location.

In carrying out the present invention as will be seen from the following description, a new method of handling is presented whereby stacks of merchandise may be bodily gripped or held at the top and bottom and then tilted over to a horizontal or an intermediate position in such a manner that the entire stack may be moved as a unit to a new location, then tilted back to a vertical position and deposited in the desired new location without handling the individual articles of the stack.

The present invention also contemplates suitable apparatus for carrying out the method just described, one form of which is shown in the drawings to be presently described.

When the merchandise is stored in a warehouse or other storage place, the individual articles may be stacked in suitable piles on supports or platforms to be later described, or directly on the floor. The apparatus, when the articles are stacked on the platforms, may be moved directly under the merchandise and tilted to move the articles off the platform, and transported to the new location, such as a box car or motor truck. The goods may then be placed in such place by moving them to the vertical position and withdrawing the supporting members of the transfer apparatus, thus permitting the stack to be deposited directly on the floor of such place, or if desired they may be deposited upon suitable platforms which cooperate with the supporting members of the transfer apparatus.

In some cases, however, the goods may be stacked directly on the floor of the warehouse or similar place, and then re-stacked on the platforms when it is desired to move the goods to a new location.

Referring to the accompanying drawings in which like numerals refer to like parts throughout the several views, the stack of goods 1, as shown in Fig. 1, may be stacked on the platform 2, just prior to the time they are to be moved, or at the time they are initially stored. The platform 2 may be of wood or any suitable material, and is provided with a horizontal upper face having a plurality of horizontally extending spaced legs 3. Each leg 3 preferably has its sides converging toward the one edge of the platform 2 so that the legs may cooperate with corresponding portions of the transfer apparatus about to be described.

The stacked goods are preferably transferred by means of a wheeled truck device, which may be of the electric type as shown in the drawings, or may be of the hand operated type. This truck comprises a frame 4 supported on rear wheels 5 and a swivel support 6 which carries the forward wheels 7.

The swivel device 6 in the case where the truck is power operated as in Fig. 1, is connected through suitable steering mechanism 8 to a steering lever 9.

The rear wheels 5 are carried by brackets 10 secured to the rear end of the truck frame 4 and these brackets 10 extend upwardly above the frame 4 to carry a horizontal pivot rod 11. The stacked merchandise is carried on the truck by a suitable framework or body which includes a pair of suitable channel members 12 that are connected together and held in spaced relation by a solid plate 13 extending across the same, which forms a bed for the body. If desired, the bed may be comprised of a plurality of extending bars.

The channels face toward each other and are provided with bracket members 14 near one end thereof. These bracket members 14 are hinged or pivotally mounted on the pivot bar 11 which extends between the extensions of the frame brackets 10, and are so positioned that when the body is in a vertical position the lower ends of the channels 12 are spaced a small distance from the floor level.

The body comprising the side channels 12 and bed 13 is movable from a vertical position to a horizontal position over the frame 4, as shown in dotted outline in Fig. 1, and this is preferably accomplished by means of mechanism comprising a pair of links 16 pivotally carried by brackets 17 secured to the edges of the channels 12. The opposite ends of these links are pivoted to the free ends of relatively long lever arms 18 carried by a shaft 19 which is rotatably mounted in brackets 20 secured to the truck frame 4.

The shaft 19 carries suitable gear sectors 21 which mesh with pinions 22 mounted on a rotatable shaft 23. The shaft 23 may be rotated by a suitable motor (not shown) in case the truck is of the electrically operated type, or may be operated by a hand crank if desired. When this shaft 23 is rotated the levers 18 cause the links 16 to move the body from a vertical to a horizontal position over the frame members 4 or vice versa, depending on the direction of rotation.

Although the tilting mechanism just described is the preferred form, it is to be understood that other mechanism may be employed, since this invention broadly contemplates any means for moving the body from a vertical to a horizontal position or vice versa.

The tiltable body is provided with a gate member for each end, the lower gate member 24 being held against movement longitudinally of the channels 12 and the upper gate member 25 being guided for movement longitudinally of the channels 12, so that when the load is positioned on the lower gate member, the upper gate member may be brought against the top of the load to compress the load and prevent displacement of the load when the body is tilted to lie over the frame 4.

The upper gate member 25 is mounted on a pair of channel members 26 which are suitably interconnected and guided within the channels 12 to telescope therewith. The guide members are moved longitudinally of the channels 12 by means of racks 27 which mesh with pinions 28 mounted on a shaft 29. The shaft 29 is rotatably journaled in brackets 30 secured to the channels 12, and is rotated by means of a gear wheel 31 that carries an operating chain 32. When the shaft 29 is rotated the pinions thereon cause the racks 27 to move the members 26 and attached upper gate 25 longitudinally of the channels 12. The members 26, like the channels 12, are preferably interconnected by a bed plate 33 extending therebetween.

The lower end gate 24 is movable transversely of the tiltable body for a reason that will soon be apparent, and is arranged when the body is in a vertical position to be withdrawn to the position shown in Fig. 2 beneath the frame 4.

Figure 7:
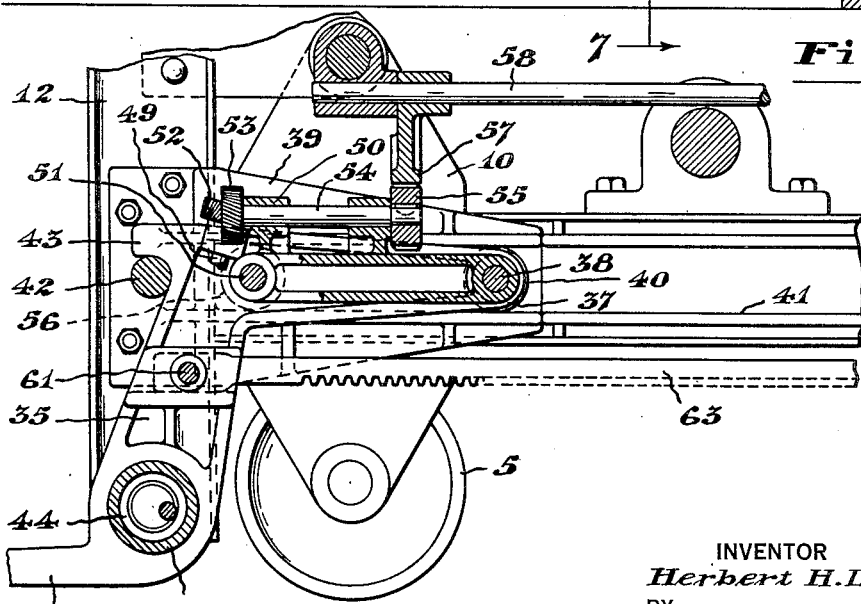
Fig. 7 is a section taken substantially on the line 7—7 of Fig. 6.

The gate 24 is composed of a plurality of arms or legs 34, each of which converges toward the free end thereof and with an upper surface also inclining toward the free end thereof. The legs 34 are mounted on a suitable hollow casting 36 and the two endmost legs, as viewed in Figs. 6 and 7, are provided with upwardly extending arms 35, each of which is provided with a forwardly extending portion 37, the forwardly extending portions 37 being interconnected by a cross bar 38. Each channel 12 is provided with a bracket 39 secured thereto which has a channel surface on its inner side extending perpendicular to the channel 12, which channel surfaces serve as guides for rollers 40 secured to the ends of the bar 38 extending through the arm portions 37. A suitable channel track 41 is also rigidly mounted at each inner side of the frame 4 in contiguous relation with the channel guide surfaces provided on the bracket 39, forming continuing guides for the rollers 40.

A suitable supporting bar 42 extends between the brackets 39 and each arm 35 is provided with a hook portion 43 which is arranged to hook over the bar 42 when the gate 24 is in extended position, as shown in Fig. 7.

Each end of the tubular member 36 carries a bushing 44 within which a plunger 45 is slidably mounted, the plunger 45 being extendable into a cored-out bracket 46 secured to the adjacent channel member 12 to prevent inadvertent withdrawal of the lower end gate. Each plunger 45 is provided with a longitudinal rod 47 having a rack surface meshed with a pinion 48 within the member 36, so that when the pinion 48 is rotated the rods 47 withdraw the plungers 45 from engagement with the brackets 46.

The pinion is mounted on a shaft 49 which is journaled at its upper end in a bracket 50 that is supported by the rod or bar 38 and a second rod 51 extending between the arms 35. This shaft 49 carries a pinion 52 which meshes with a similar pinion 53 mounted on a shaft 54 also carried by the bracket 50, the shaft 54 having a spur pinion 55 at its opposite end. The rod 51 also has rollers 56 at its ends which are guided in the tracks formed on the plates 39. It is to be particularly noted that this mechanism is carried by the plates 39 and when the body is tilted about the pivot bar as an axis, the entire mechanism is tilted therewith, thus breaking the continuity of the guide track. The spur gear 55 is rotated by means of a gear sector 57 mounted on a shaft 58 that is supported by the stationary body pivot bar, the meshing of the gear 55 and sector 57 being so arranged that it is broken when the body is tilted.

The shaft 49 also carries a pinion 59 mounted within a housing 60 which meshes with a pair of oppositely extending rack bars 61 which are guided by the housing 60 and by channel fingers 62 formed on the arms 35, the fingers 62 supporting relatively long racks 63 which are operatively in mesh with pinions 64 mounted on a shaft 65 that may be driven by a motor or hand crank.

With the lower gate 24 in extended position, it is supported by the support bar 42 and the plungers 45 and is locked against any withdrawal movement by the plungers. When, however, it is desired to withdraw the lower end gate 24, the shaft 58 is rotated which causes the pinion 48 and racks 47 to withdraw the plungers 45 from the channels 12, and which simultaneously causes the pinion 59 to move the ends of the racks 61 to engage with the racks 63 and thus connect the racks 63 with the lower end gate 63. The pinions 64 may then be rotated to cause the racks 63 to draw the end gate underneath the frame 4, as shown in Fig. 2, the rollers 40 and 56 being guided by the tracks carried by the plates 39 and frame 4.

Interlocking means are provided so that the truck body cannot be tilted to a horizontal position when the end gate is in a withdrawn position.

Referring to Fig. 5, it is to be particularly noted that the legs 34 of the lower end gate are arranged to overlap with the legs of the stack support which is shown in broken outline.

Assuming, for example, that a plurality of boxes 1 are stacked on the platform 2, as in Fig. 1, and it is desired to move the same to a new location such as a freight car, and furthermore that in moving the stack it is necessary to go through a passageway of materially lesser height than the stack 1, the operator moves the truck toward the stack with the body in a vertical position, as in Fig. 1, and manipulates the same until the legs 34 of the end gate 24 overlap with the corresponding legs of the platform 2, as in Fig. 5, and until the stack engages the bed plate of the body.

When this position is reached the operator then lowers the upper gate 25 by pulling on the actuating chain until the upper gate engages the top of the stack and compresses the pile, and then throws latches 66 into engagement with the rack to lock the same against movement.

The operator next causes the shaft 19 to be rotated which, through the cooperating mechanism and linkage, causes the body to be tilted and lowered to a horizontal position over the frame 4, as shown in dotted outline in Fig. 1. During the initial movement, the legs 34 of the lower end gate move relative to the platform 2 and gradually raise and tilt the stack of boxes off the platform, the bed plates serving to support the boxes and the upper end gate serving to hold them in their adjacent relationship.

When the load and body is lowered to the horizontal or an inclined position, it is obvious that the height is materially reduced, and the loaded truck can be easily moved through a doorway or other small opening.

When the freight car is reached, and the exact position for the boxes is determined, the operator causes the body to be tilted from the horizontal to the vertical position, and then rotates the shaft 58 which releases the plungers 45 from the channels 12 and at the same time engages the racks 63 with the arms 35 of the lower end gate 24. The operator actuates the racks 63 and the action thereof gradually withdraws the lower end gate 24 from underneath the stack of boxes 1, the vertical body thus holding the boxes against disarrangement during the withdrawal of the end gate. It is thus seen that the stack of boxes is gradually lowered to the floor and that it is unnecessary to individually handle or restack the boxes when they are deposited from the truck.

In order to assist the withdrawal of the end gate it may be desirable to provide suitable rollers 70 on the free ends thereof which contact with the floor.

The present invention thus provides a new method of transferring stacked goods from one place to another, which does not necessitate the individual handling of the articles. Each stack is merely held at its upper and lower ends and then bodily lifted and moved to a horizontal position. The stack is then moved in this horizontal position to the new location, again raised to a vertical position, and then deposited without individually handling the articles comprising the stack.

Figure 8:
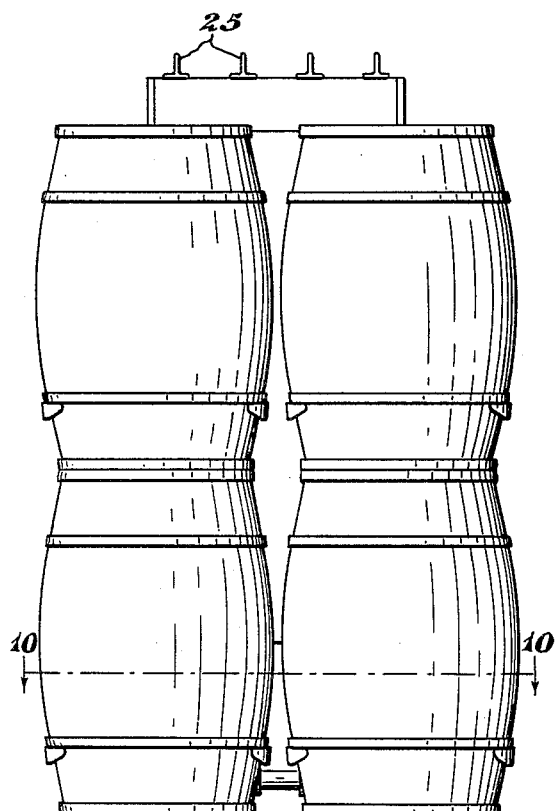
Figure 9:
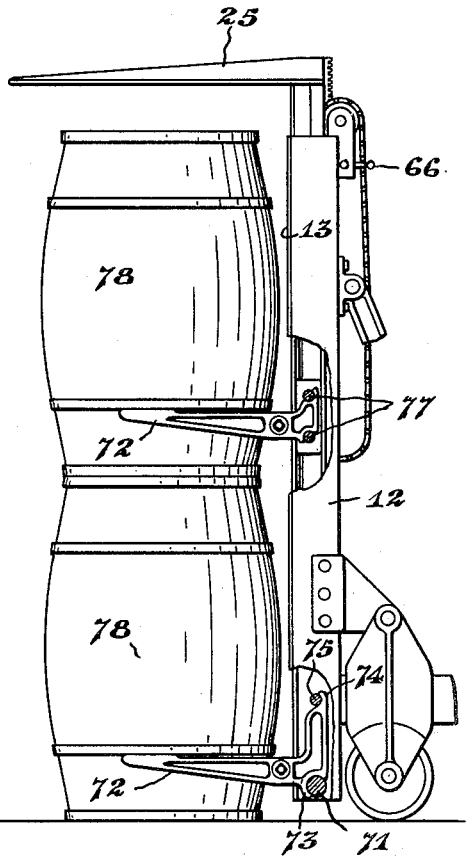
Fig. 9 is a fragmentary side elevation of the apparatus shown in Fig. 8.
Figure 10:
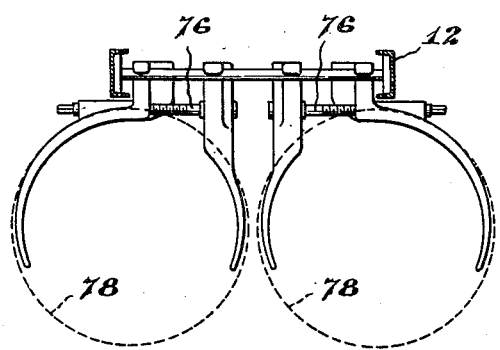
Fig. 10 is a section taken substantially on the line 10—10 of Fig. 8, the barrels being shown in dotted outline.

In Figs. 8 to 10, inclusive, a modified form of the apparatus is shown which is particularly adapted for moving barrels, barrels usually being stored two deep.

In the construction previously described, the lower end gate 24 is removable, and the device is so arranged that a rod 71, as shown in Fig. 9, may be extended between the members 46 carried by the channels 12, and the barrel supporting device shown in Fig. 10 incorporated therein. This device comprises two pairs of curved arms 72 positioned side by side, each arm having a hook portion 73 seated on the bar 71, an upper oppositely hooked portion 74 arranged to hook over a rod 75 extending between the channels 12 above the lower removable bar 71. The arms 72 of each pair are curved toward each other and provided with an interconnecting screw 76 which is arranged to adjust the space between the arms 72 to accommodate different sizes of barrels. The slide members which support the upper end gate 25 also carry a pair of spaced rods 77 which are arranged to support two pairs of arms 72 identical in construction with the lower arms, the bed plates extending across the channels 12 being provided with slots to permit the upper arms 72 to be supported on the rods 77.

The arms 72 are so arranged that they will pass around the lower portions of the barrels 78 when the truck is moved toward the same and then engage a larger portion when the body is tilted to a horizontal position over the truck frame, to bodily lift the barrels from the floor for transportation.

In this construction it can be seen that two stacks of barrels may be easily moved from one place to another without disturbing the stacked relation thereof.

Aside from the specific embodiments of the invention herein shown and described, it will be understood that numerous details of the construction may be altered or omitted without departing from the spirit and scope of this invention, and that I do not desire to limit the invention to the exact construction herein set forth, as I desire to claim the invention broadly as well as specifically, as indicated in the appended claims.

What I claim is:

1. Apparatus for transferring stacked merchandise comprising a movable horizontal frame, a body tiltably mounted on said frame for movement from a vertical to a tilted position and vice versa, said body having means at one end thereof for supporting a stack of merchandise when said body is in a vertical position, mechanical means for moving said body relative to said frame, and means for withdrawing said first mentioned means from underneath the merchandise longitudinally of said frame and transversely of said body, whereby the merchandise may be deposited in its original stacked condition.

2. Apparatus for transferring stacked merchandise comprising a movable horizontal frame, a body tiltably mounted on said frame for movement from a vertical to a tilted position and vice versa, said body including means at one end thereof for supporting a stack of merchandise in vertical position, a bed on said body extending perpendicular to said means, and arranged to engage a side of the stack of merchandise, mechanical means for moving said body relative to said frame, and means for moving said first mentioned means longitudinally of said frame and transversely of said bed whereby said first mentioned means may be withdrawn from underneath the merchandise to discharge said merchandise in its original stacked position.

3. Apparatus for transferring stacked merchandise comprising a movable frame, a body tiltably mounted on said frame for movement from a vertical to a horizontal position and vice versa, said body including a bed portion, a lower end gate engageable with the bottom of a stack of merchandise when said body is in vertical position to support said stack, an upper end gate engageable with the top of said stack, means for moving said body to a horizontal position over said frame, said bed and end gates holding the individual articles of merchandise in their original adjacent relation for transportation, said means also being arranged to move said body to vertical position, and means for moving said lower end gate longitudinally of said frame when said bed is in vertical position, whereby said lower end gate may be withdrawn from underneath said stack to discharge the stack in its original stacked position.

4. A transfer truck comprising a frame, a bed portion tiltably mounted on said frame for movement from a vertical to a horizontal position and vice versa, means for tilting said bed portion through such movement, an end gate at each end of said frame, the upper end gate when said bed is in vertical position being movable toward the other end gate, whereby said end gates may engage the ends of a stack of merchandise to prevent disarrangement of the individual articles of the stack during movement to a horizontal position for transportation, the lower end gate when said bed portion is in vertical position being movable longitudinally of said frame to discharge the merchandise in original stacked position, and means carried by said frame for moving said lower end gate longitudinally of said frame.

5. Power apparatus for transferring stacked merchandise, comprising a movable frame, a body tiltably mounted on said frame for movement from vertical to a tilted position and vice versa, power means for effecting such movement, said body including a gate for supporting a stack of merchandise in a vertical position, a supporting bed on said body for supporting the merchandise in a tilted position, and reversible power means for moving said gate longitudinally of said frame and forwardly into supporting position underneath the stack of merchandise and also for withdrawing said gate longitudinally of said frame and from underneath the stack of merchandise to deposit the same in its original stacked position.

In testimony whereof I affix my signature.

HERBERT H. LEDERER.